United States Patent [19]

Butland

[11] 4,355,050

[45] Oct. 19, 1982

[54] PROCESS FOR PRODUCING A NATURAL FRUIT CANDY

[76] Inventor: Peter Butland, R.R. #1, Inglewood, Ontario, Canada, L0N 1K0

[21] Appl. No.: 290,871

[22] Filed: Aug. 7, 1981

Related U.S. Application Data

[63] Continuation of Ser. No. 134,909, Mar. 28, 1980, abandoned, which is a continuation-in-part of Ser. No. 25,761, Apr. 2, 1979, abandoned.

[51] Int. Cl.³ .............................................. A23L 1/212
[52] U.S. Cl. .................................... 426/615; 426/640; 426/660; 426/506; 426/810
[58] Field of Search ............... 426/640, 615, 660, 506, 426/810, 599, 616

[56] References Cited

U.S. PATENT DOCUMENTS

| 101,562 | 4/1870 | Alden | 426/640 |
| 793,615 | 6/1905 | Sherman | 426/640 |
| 1,399,471 | 12/1921 | Faitelowitz | 426/640 |
| 1,543,948 | 6/1925 | Moore | 426/640 |
| 1,717,489 | 6/1929 | Barlow | 426/640 |

OTHER PUBLICATIONS

Roth, June., Old Fashioned Candy Making, Henry Regency Co., Chicago, 1974, p. 126.

Primary Examiner—Jeanette M. Hunter
Attorney, Agent, or Firm—Fetherstonhaugh & Co.

[57] ABSTRACT

A process for producing a natural fruit candy by mixing enzyme deactivated dehydrated fruit and enzyme deactivated fruit juice concentrate to provide a mixture in the form of a plastic mass having a moisture content in the range of 8 to 50% by weight the relative proportion of dehydrated fruit and fruit juice concentrate being limited only by the need to achieve a moisture content in the plastic mass which falls within the required range. The plastic mass is then formed to the required product configuration.

16 Claims, No Drawings

PROCESS FOR PRODUCING A NATURAL FRUIT CANDY

This is a continuation, of application Ser. No. 134,909 filed Mar. 28, 1980, now abandoned which is a continuation-in-part of application Ser. No. 025,761 filed Apr. 2, 1979 now abandoned.

FIELD OF INVENTION

This invention relates to a process for producing a natural fruit candy.

Despite the fact that health authorities have expressed great concern about the consumption of confection items such as candy, these products continue to enjoy a substantial degree of popularity. Most candy confections contain large percentages of refined sweeteners such as sugar (sucrose), glucose, dextrose, maltose, sorbitol and other relates sugars together with ingredients such as starch, pectin, fruit acids, and buffers which, like the sugars are refined and do not contain the essential proteins, amino acids, vitamins, minerals to be found in natural foods. Numerous attempts have been made to add amino acids, proteins vitamins and minerals to candy, however, it has been found that in order to achieve this acquired addition, a further addition of colour and flavouring additives is required. Most candies have artificial colour and artificial flavour additives together with numerous other artificial ingredients, many of which are considered to be injurious to health.

Refined sugars are considered to be injurious to health and are considered to contribute substantially to tooth decay in young children. For these and other reasons the artificial ingredients extensively used in confections such as candy are considered to be undesirable.

Dehydrated fruit such as apples, prunes, apricots, peaches and the like, while not containing refined sugars, do not have the taste appeal as the conventional candies. The natural sugar content of most dehydrated fruits is normally not high enough to be comparable to that of the average candy confection. In addition, dehydrated fruit must be fumigated to prevent or kill any infestation and additives such as sulphur dioxide are generally added to dried or dehydrated fruit to prevent darkening of the fruit, poor colour and to avoid off-flavours. Thus, dehydrated fruits are not comparable to taste to candy confections and do not enjoy the wide spread popularity of conventional candies.

The process of the present invention serves to produce a natural fruit product which has many of the desirable characteristics of candy confection while avoiding the need to fumigate the dehydrated fruit and the use of additives such as sulphur dioxide, refined sugar of any type, artificial colour additives, artificial flavour additives and artificial or refined ingredients of any type. This is achieved by using only enzme deactivated dehydrated fruit and enzyme deactivated fruit juice concentrate. The end product retains all the essential proteins, amino acids, vitamins and minerals normally found in fruit. The end product may look, taste and have a mouth feel characteristic similar to that of conventional candy products.

Enzyme deactivation of the fruit, dehydrated fruit, fruit juice concentrate or puree is achieved by heating to a temperature of 195° F. for a period of at least 15 seconds at least 180° F. and preferably. The enzyme deactivation process serves to kill any infestation which may be present in the fruit and thereby eliminates the need to fumigate the fruit.

An important step in the process of the present invention is the holding of the plastic mass formed by the mixing of the dehydrated fruit and concentrate to achieve equalization of the moisture content throughout the plastic mass by natural osmosis. The holding period, prior to the formation of the mass to the required product configuration is preferably at least 4 to 12 hours. The plastic mass may then be extruded or otherwise shaped to the required product configuration.

SUMMARY OF INVENTION

According to one aspect of the present invention a process for producing a natural fruit candy comprises the steps of mixing an enzyme deactivated dehydrated fruit and a enzyme deactivated fruit juice concentrate or puree to provide a mixture in the form of a plastic mass having a moisture content in the range of 8 to 50% by weight and holding the plastic mass for a period of at least four hours to permit equalization of the moisture content throughout the mass before forming to the required product configuration.

According to a further aspect of the present invention a process for producing a natural fruit candy comprises the steps of enzyme deactivating a selected fruit by heating it to a temperature of about 195° F. for a period of at least 15 seconds dehydrating, said selected fruit to a moisture level of 2 to 3% by weight, preparing an enzyme deactivated fruit juice concentrate or puree having a concentration of about 60 to 76′ Brix, mixing said enzyme deactivated dehydrated fruit and said enzyme deactivated fruit juice concentrate or puree in the proportions required to provide a mixture in the form of a plastic mass having a moisture content in the range of 8 to 50% by weight, the relative proportions of dehydrated fruit to fruit juice concentrate or puree being such as to provide a moisture content within the required range in the end product, holding said mass for a period of at least 4 to 12 hours to permit equalization of the moisture content by natural osmosis prior to forming the mixture to the required product configuration.

The invention will be more clearly understood after the reference to the following specific examples.

Fruits which may be used in the process of the present invention either independently or in combination with one another are as follows:

| | | |
|---|---|---|
| Apple | Fig | Peach |
| Apricot | Grape | Pear |
| Blackberry | Grapefruit | Pineapple |
| Blackcurrent | Guava | Plum |
| Blueberry | Lemon | Prune |
| Cherry | Lime | Red Currant |
| Cranberry | Mango | Raspberry |
| Coconut | Orange | Soursop |
| Date | Papaya | Strawberry |
| Elderberry | Passionfruit | Tamarind |

Prior to mixing, it is necessary to prepare or obtain a supply of enzyme deactivated dehydrated fruit and a supply of enzyme deactivated concentrated fruit juice or puree.

The fruit may be dehydrated by air drying, hot air drying, drum drying, vacuum drying or may other conventional method to a moisture level preferably in the range of 2 to 3% by weight. The dehydrated fruit should, however, contain no additives such as artificial colouring, artificial flavouring, preservative or refined sugar additives. The fruit is enzyme deactivated before or during dehydration by heating to a temperature in excess of 180° F. preferably 195° F. for at least 15 seconds. The natural enzyme deactivated dehydrated fruit is all that is required for use in the process of the present invention.

The enzyme deactivated fruit juice concentrate and the puree may be prepared by any conventional method. The fruit juice concentrate is preferably concentrated under vacuum to 60 to 76' Brix. The fruit puree is preferably made by pureeing the fruit and concentrating to approximately 30/34 Brix by any well known method. The concentrate or puree is made from enzyme deactivated fruit or it is enzyme deactivated after it is produced.

Natural fruit esters (aroma) may be recovered in the preparation of dehydrated fruit or concentrated fruit or puree and returned to the enzyme deactivated concentrate or puree or the mixture formed with the enzyme deactivated dehydrated fruit which will be described hereinafter.

EXAMPLE 1

(a) 130 grams of enzyme deactivated dehydrated apple, screen size 14 mesh and below, are placed in a laboratory mixer at ambient temperature.

(b) 85 ml (115.78 gms) of 72' Brix enzyme deactivated peach juice concentrate with esters (aroma) returned is mixed with the enzyme deactivated dehydrated apples.

(c) a plastic mass is formed.

(d) the plastic mass is held to allow its moisture content to equalize by natural osmosis. Time period is generally 4–12 hours.

(e) The plastic mass is then extruded to correct shape required.

EXAMPLE 2

(a) 130 grams of enzyme deactivated dehydrated banana flakes are placed into laboratory mixer.

(b) 85 ml (112.08 gms) of enzyme deactivated concentrated orange juice 65' Brix is mixed with the enzyme deactivated dehydrated bananas.

(c) A plastic mass is formed.

(d) Same as experiment #1-(d)

(e) Same as experiment #1-(e)

EXAMPLE 3

(a) 150 grams of enzyme deactivated dehydrated apple, screen size 14 mesh and below, is placed into a laboratory mixer.

(b) 75 grams 32/34 solids enzyme deactivated apricot puree is mixed with the dehydrated apple.

(c) A plastic mass is formed.

(d) Same as experiment #1(d)

(e) Same as experiment #1(e)

Examples of protein (amino acid), fat, carbohydrate, fibre, mineral, vitamins and other components found in apples and peaches are shown in the following Table 1. It will be noted that in the case of dehydrated apples, 6.1 grams of apples (peeled and cored) produce 1.0 grams of dehydrated apples 2% moisture level and 6.6 grams of peaches (peeled and pitted) produce 1 gram of 72 Brix concentrated peach juice.

|  | APPLES-Peeled per 100gm | Peach Juice-Yellow Peeled per 100gm |
|---|---|---|
| PROTEIN (Containing Amino Acids) | $0.2 \times 6.1 = 1.22$ | $0.6 \times 6.6 = 3.96$ |
| FAT | $0.3 \times 6.1 = 1.83$ | $0.1 \times 6.6 = .66$ |
| CARBOHYDRATES | $13.9 \times 6.1 = 84.8$ | $9.7 \times 6.6 = 64$ |
| FIBRE | $0.6 \times 6.1 = 3.66$ | Nil |
| ASH | $0.3 \times 6.1 = 1.83$ | $0.5 \times 6.6 = 3.3$ |
| CALCIUM | 6 mgm $\times 6.1 = 36.6$ mgm | 9 mgm $\times 6.6 = 59.4$ mgm |
| PHOSPHORUS | 10 mgm $\times 6.1 = 61.0$ mgm | 19 mgm $\times 6.6 = 125.4$ mgm |
| IRON | 0.3 mgm $\times 6.1 = 1.8$ mgm | 0.5 mgm $\times 6.6 = 3.3$ mgm |
| SODIUM | 1 mgm $\times 6.1 = 6.1$ mgm | 1 mgm $\times 6.6 = 6.6$ mgm |
| POTASSIUM | 110 mgm $\times 6.1 = 671$ mgm | 202 mgm $\times 6.6 = 1333.2$ mgm |
| VITAMIN A (International Units per 100 grams) | 40 IU $\times 6.1 = 244$ IU | 330 IU $\times 6.6 = 8778$ IU |
| THIAMINE | .03 mgm $\times 6.1 = .183$ mgm | .02 mgm $\times 6.6 = .132$ mgm |
| RIBOFLAVIN | .02 mgm $\times 6.1 = .122$ mgm | .05 mgm $\times 6.6 = 0.33$ mgm |
| NIACIN | .1 mgm $\times 6.1 = .61$ mgm | .05 mgm $\times 6.6 = 0.33$ mgm |
| VITAMIN C | 2. mgm $\times 6.1 = 12.2$ mgm | 1. mgm $\times 6.6 = 6.6$ mgm |

SUMMARY OF COMBINATION OF INVENTION e.g. 130 grams Dehydrated Apples, 115.78 grams of 72' Brix Concentrated Fruit Juice (apple/peach fruit candy). (Reference Experiment #1)

| | |
|---|---|
| PROTEIN (Amino Acids) | 2.511 grams per 100 grams |
| FAT | 1.279 grams per 100 grams |
| CARBOHYDRATES | 74.996 grams per 100 grams |
| FIBRE | 1.936 grams per 100 grams |
| ASH | 2.523 grams per 100 grams |
| CALCIUM | 47.340 mgm per 100 grams |
| PHOSPHORUS | 90.808 mgm per 100 grams |
| IRON | 2.507 mgm per 100 grams |
| SODIUM | 6.335 mgm per 100 grams |
| POTASSIUM | 982.849 mgm per 100 grams |
| VITAMIN A | 4264.126 IU per 100 grams |
| THIAMINE | .159 mgm per 100 grams |
| RIBOFLAVIN | .220 mgm per 100 grams |
| NIACIN | .478 mgm per 100 grams |
| VITAMIN C | 9.558 mgm per 100 grams |
| WATER | Balance |

Fruit candy produced in accordance with Examples 1 and 2 above are formed to a rectangular configuration measuring 1"×1"×¼". It was found that these products kept moist after being subjected to a variable humidity for a period of 52 weeks. At the end of the 52 week period the colour of the fruit product was very close to the original. Slight darkening did occur, however, the darkening was not objectionable. After the 52 week period the fruit products retained a flavour very close to that of the original product.

It is believed that a moisture content is retained by the fruit candy of the present invention due to the natural invert sugars and sorbitol present and retained in the fruit product.

It is believed that when the solids of the dehydrated fruit are mixed with the liquid in the form of the concentrate on puree with or without other natural sugar, the following processes take place. The solubles, by the natural process of osmosis, will come to a constant level. In order to achieve this, the mixture is held after mixing as previously described. A chemical reaction of the complex nature will take place while details of the reaction are not known, the process is not reversible. A definite flavour and mouth feel results. The flavour changes occur due to the chemical reaction which is a general reaction between the aldehydes, ketones, mono and dicarboxylic acids present in the mixture. The moisture level of the dehydrated fruit and concentrated fruit juice will also settle at a constant moisture level. The experiments show that specific combinations of dehydrated fruit and concentrated fruit juice must be used to obtain a correct consistency.

EXAMPLE 4

(a) 130 grams of enzyme dehydrated deactivated apple of 3% moisture is placed in a laboratory mixer at ambient temperature.

(b) 8.5 ml (115.78 grams) of 72' Brix of 19% moisture level enzyme deactivated raspberry juice concentrate with esters (aroma) returned is mixed with (a).

(c) A plastic mass is formed.

(d) To calculate moisture content:

```
130.00 at  3% moisture =  390.00
115.78 at 18% moisture = 2084.04
245.78                   2474.04
```

$$\frac{2474.04}{345.78} = 10.066\% \text{ moisture}$$

(e) If one took say a dehydrated fruit, e.g. 130.00 gms, at say 20% moisture, e.g. prunes, apricot, and mixed with a fruit juice—say 115.78 gms apple at 11% moisture then the resultant mixture would be:

```
130.00 gms at 20% moisture =  2600.00
115.78 gms at 89% moisture = 10304.42
245.78                       12904.42
```

$$\frac{12904.42}{245.78} \times 100\% \; 52.50\% \text{ moisture}$$

At this level fermentation or mould would occur at ambient temperature, hence proper moisture combination is essential.

According to the present invention, the moisture content may be in the range of 8 to 50% when the final product is to be consumed immediately or to be frozen so as to be preserved or to have a preservative added thereto. Where the final product is to contain no preservative and is not to be frozen but is required to be suitable for storing over an extended period of time, the moisture content in the final product is preferably in range of 8 to 20%.

The end product retains a large proportion of the fibre of the original fruit by reason of the fact that one of the constituents is dehydrated fruit. The retention of the natural fibre contributes to the food value of the end product.

The fruit product of the present invention may be used as a confection such as a candy and may be chocolate enrobed, it may be used as a filler for chocolates, as a snack food, as a topping or a filling in bakery products and as an additive ingredient for yogourt, frozen desserts, ice cream, breakfast cereals and the like.

From the foregoing it will be apparent that the fruit product of the present invention is formed from natural fruit products and need contain no artificial additives.

What I claim as my invention:

1. A process for producing a natural fruit candy comprising the steps of:
   (a) mixing enzyme deactivated dehydrated fruit having a moisture content no greater than 3% by weight and enzyme deactivated fruit juice concentrate to provide a mixture in the form of a plastic mass, the relative proportions of dehydrated fruit to fruit juice concentrate being such that said plastic mass has a moisture content in the range of 8 to 50% by weight,
   (b) holding the plastic mass for at least four hours to permit equalization of the moisture content throughout the mass by reason of natural osmosis and
   (c) forming individual candies from the plastic mass.

2. A process as claimed in claim 1 wherein the mixture is held for a period of from 4 to 12 hours.

3. A process as claimed in claim 1 wherein the fruit juice concentrate is in the form of a puree concentrated to about 30 to 34 Brix.

4. A process as claimed in claim 1 wherein the moisture content of the mixture is in the range of 8 to 20% by weight such that the product may be stored for a substantial period of time in a non-frozen condition without the addition of a preservative.

5. A process as claimed in claim 1 wherein the candies are frozen after forming to the required product configuration.

6. A process as claimed in claim 1 wherein the dehydrated fruit and fruit concentrate are derived from the same fruit.

7. A process as claimed in claim 1 wherein the dehydrated fruit and fruit juice concentrate are derived from different fruits.

8. A process as claimed in claim 1 wherein the dehydrated fruit and fruit juice are derived from one or any combination of the following fruits:

| Apple | Fig | Peach |
|---|---|---|
| Apricot | Grape | Pear |
| Blackberry | Grapefruit | Pineapple |
| Blackcurrent | Guava | Plum |
| Blueberry | Lemon | Prune |
| Cherry | Lime | Red Currant |
| Cranberry | Mango | Raspberry |
| Coconut | Orange | Soursop |
| Date | Papaya | Strawberry |
| Elderberry | Passionfruit | Tamarind |

9. A process for producing a natural fruit candy comprising the steps of:
   (a) dehydrating and enzyme deactivating a fruit to a moisture level of 2 to 3% by weight,
   (b) preparing an enzyme deactivated fruit juice concentrate having a concentration of about 60 to 76' Brix, (c) mixing said enzyme deactivated dehydrated fruit and said enzyme deactivated fruit juice concentrate in the proportions required to provide a mixture in the form of a plastic mass having a moisture content in the range of 8 to 50% by weight, (d) holding plastic mass for at least four hours to permit equalization of the moisture content throughout the mass by means of natural osmosis, (e) forming the mixture to provide a plurality of candies.

10. A process as claimed in claim 9 wherein the mixture is held for a period of from 4 to 12 hours.

11. A process as claimed in claim 9 wherein the fruit juice concentrate is in the form of a puree concentrated to about 30/34 Brix.

12. A process as claimed in claim 9 wherein the moisture content of the mixture is in the range of 8 to 20% by weight such that the product may be stored for a substantial period of time in a non-frozen condition without the addition of preservative.

13. A process as claimed in claim 9 wherein the candies are frozen after forming.

14. A process as claimed in claim 9 wherein the dehydrated fruit and fruit concentrate are derived from the same fruit.

15. A process as claimed in claim 9 wherein the dehydrated fruit and fruit juice concentrate are derived from different fruits.

16. A process as claimed in claim 9 wherein the dehydrated fruit and fruit juice are derived from one or any combination of the following fruits:

| | | |
|---|---|---|
| Apple | Fig | Peach |
| Apricot | Grape | Pear |
| Blackberry | Grapefruit | Pineapple |
| Blackcurrent | Guava | Plum |
| Blueberry | Lemon | Prune |
| Cherry | Lime | Red Currant |
| Cranberry | Mango | Raspberry |
| Coconut | Orange | Soursop |
| Date | Papaya | Strawberry |
| Elderberry | Passionfruit | Tamarind |

* * * * *